United States Patent [19]

Melamed et al.

[11] 4,215,179

[45] Jul. 29, 1980

[54] COATING CONCRETE WITH LATEX POLYMERS

[75] Inventors: Sidney Melamed, Elkins Park; Ronald W. Novak, Hatfield; Clarence J. Neyhart, Harleysville, all of Pa.

[73] Assignee: Rohm and Haas Company, Philadelphia, Pa.

[21] Appl. No.: 25,429

[22] Filed: Mar. 30, 1979

[51] Int. Cl.$^2$ .......................... B05D 1/38; B05D 3/04; B32D 13/12
[52] U.S. Cl. .................................... 428/451; 427/341; 427/379; 428/454
[58] Field of Search ............... 427/407 R, 385 C, 379, 427/341; 428/451, 454

[56] References Cited

U.S. PATENT DOCUMENTS

| | | | |
|---|---|---|---|
| 3,590,016 | 6/1971 | Hopwood et al. | 260/29.6 |
| 3,759,915 | 9/1973 | Kottke | 260/41 R |
| 4,051,089 | 1/1977 | Tobias et al. | 260/22 R |
| 4,089,999 | 5/1978 | Mondt et al. | 427/385 R |

FOREIGN PATENT DOCUMENTS 1088374 10/1967 United Kingdom .

*Primary Examiner*—James R. Hoffman

[57] ABSTRACT

It has been discovered that the adhesion of latex coatings to concrete surfaces can be significantly improved by prior treatment of the surface with an air curable, water soluble polymer. Preferred water soluble polymers cure oxidatively in a manner similar to drying oils.

20 Claims, No Drawings

COATING CONCRETE WITH LATEX POLYMERS

RELATED APPLICATIONS

The application is related to the application of Ronald W. Novak and Benjamin B. Kine, Ser. No. 970,717, filed Dec. 18, 1978 which is a continuation-in-part of application Ser. No. 783,587, filed Mar. 1, 1977, and now abandoned, which in turn was a continuation-in-part of Ser. No. 751,507, filed Dec. 17, 1976, now abandoned.

BACKGROUND OF THE INVENTION

In most areas of Trade Sales coatings, water based latex coatings or paints have replaced the traditional solvent based or alkyd coatings. Water based latex coatings have the advantage over solvent based coatings in terms of generally superior durability, ease of application and clean-up, and in the elimination of costly, toxic, flammable solvents. One area in which latex systems have failed to replace solvent based systems is in coatings for concrete surfaces, particularly paints for concrete flooring. In this utility excellent adhesion of the coating to the concrete surface is required in order to prevent blistering and peeling of the paint film during normal use. Excellent adhesion is obtained with solvent based coatings because they penetrate and bind the loose, porous surface of a concrete substrate. Latex coatings, even those based on very small particle size dispersions ($0.03$–$0.05\mu$) have not been successfully used by us to penetrate typical concrete surfaces, although Mondt et al indicate in U.s. Pat. No. 4,089,999 that they have been able to do so. Because of their inability to penetrate and bind, standard latex coatings form films which adhere poorly to concrete surfaces. This property has severely limited the market for latex floor paints.

DETAILED DESCRIPTION

We have discovered that application of a tie-coat or primer in the form of an essentially water soluble, air curable (i.e., oxidatively curable) polymer, to a concrete surface prior to application of a latex paint, significantly improves adhesion of the paint to the concrete substrate. By essentially water soluble it is meant that water is the primary constituent of the polymer solvent; up to 50% organic liquid cosolvent may be utilized.

To function effectively the coating must be of a low enough viscosity to effectively penetrate the concrete surface, it must effectively bind the loose concrete surface, and must be resistant to the severe alkalinity of the substrate. To achieve these properties, careful control of the tie-coat polymer molecular weight and composition are required. The molecular weight must be low enough such that the application viscosities are 50–1,000 cps., preferably 100–1,000 cps. (at 20°–22° C.), with the polymer solids content of the tie coating solution being at least 10%. A useful test is the viscosity of a solution containing, by weight, 20% of the soluble polymer in an 80/20 mixture of water and diethylene glycol monobutyl ether; if the viscosity is between 50 and 10,000 cps., preferably 100–5,000 cps., the product is satisfactory, although it may have to be diluted to achieve 1,000 cps. Tie coats applied at greater than 1,000 cps. will not penetrate the concrete surface to a sufficient extent to function effectively. Too low a polymer solids results in too little coating for effective binding of the concrete surface. If the molecular weight is too low, the tie coat polymer will not be an effective binder. The composition of the polymer must be such that it can be solubilized in an essentially aqueous solvent (no more than 50% liquid organic cosolvent), and that once cured, the polymer is not severely swollen or degraded by the alkaline substrate or by moisture, or a combination thereof. We have found that air curable acrylic copolymers and water reducible alkyds function effectively as tie coatings.

The preferred tie-coat or primer of the invention is a water-soluble salt of an air curable acrylic copolymer. These polymers contain pendant groups derived from an unsaturated drying oil fatty acid hydroxyamide, carboxy groups, carboxy ester groups and optionally the residues of other unsaturated addition polymerizable monomers, the carboxy units being present in a critical amount and the polymer having a critical molecular weight and the like.

In the past, similar polymers have been known for coatings and for other utilities such as putty-like caulking compositions. The caulking compositions are shown in Kottke U.S. Pat. No. 3,759,915 whereas the coating compositions are shown in Hopwood et al U.S. Pat. No. 3,590,016. The related applications noted above concern the use of the same polymers as the present preferred polymers, in coating compositions for wood, concrete, metal, etc., but do not disclose their use as tie-coats for latex floor paints on concrete.

The polymer has the structure:

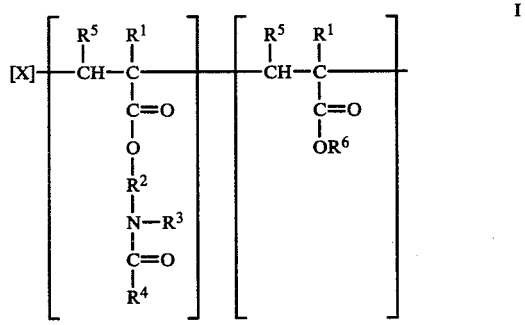

wherein $R^1$ is H, a lower alkyl radical having one to five carbon atoms, halogen, —CN, or —CH$_2$COOR, —COOR, or —CH$_2$COOH, R being a lower alkyl radical havin from one to eight carbon atoms;

$R^2$ is $(CR^7_2)_n$ wherein $R^7$ is —H or —CH$_3$ and n is 1 or 2;

$R^3$ is H, or a lower alkyl radical having from one to 8 carbon atoms;

$R^4$ is an unsaturated, air-curable alkyl radical;

$R^5$ is H, —COOH, —CONH$_2$, or —COOR, wherein R is as above;

$R^6$ is H, or an aliphatic or cycloaliphatic radical having from one to 20 carbon atoms; and X is optional and when present is derived from at least one vinyl monomer different than the residues depicted;

the units in brackets being in any order, portions of the $R^6$ radicals, in units of the formula:

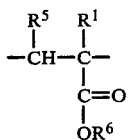

being H in a sufficient number of units of Formula II to provide the polymer with a carboxy content of 0.2–3.0 meq/g of polymer, preferably 0.4–1.3 meq/g. of polymer, more preferably 0.5–1 meq/g, the quantity of carboxy groups being sufficient, when in the form of salt groups with said amine or ammonia, to confer solubility in a solvent composed primarily of water, the amount of carboxy-containing units of Formula II wherein $R^6$ is H being between 2 and 20 parts by weight of the total polymer. Preferably a portion of the radical $R^6$ in the units of Formula II is at least one aliphatic or cycloaliphatic radical whereby said portion of the units of Formula II is derived from at least one ester which when homopolymerized gives a polymer having a $T_g$ of between −80° C. and 120° C., said ester units forming up to 80 parts by weight of the polymer; the polymer having between about 10 and 70 parts, preferably between about 20 and 50 parts by weight of units of the formula:

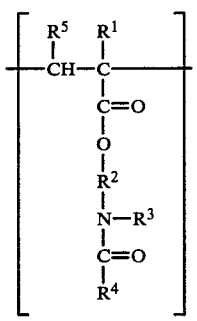

wherein $R^1$, $R^2$, $R^3$, $R^4$, and $R^5$ are as identified above, any balance of the polymer being the units of —X— of addition polymerized ethylenically unsaturated monomers other than said units of Formulas II and V, the total parts of all said units being 100, the Mv of the backbone polymer being between about 5,000 and 80,000.

The unit described by Formula V is prepared by reaction of a portion of the carboxylic acid mer units, of the prepolymer or backbone copolymer, with a fatty acid alkanol amine. The backbone polymer, before esterification by the hydroxyamide, has the formula

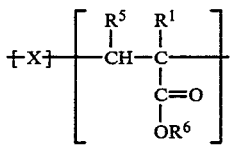

and the fatty acid amide has the formula:

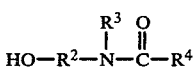

wherein the symbols used have the same meaning as given above.

It is to be understood that when $R^1$ and/or $R^5$ contain free carboxy groups (—COOH), the hydroxyamide will also react therewith to give pendant ester groups equivalent to the structure of Formula V.

Preferred compositions contain polymer units of:
(a) 0–80, preferably 10–60 parts by weight of a monomer selected from esters of acrylic acid or methacrylic acid,
(b) 0–60 parts by weight of a vinyl aromatic hydrocarbon or an $\alpha,\beta$-unsaturated nitrile.
(c) 2–30, preferably 3–10 parts of an ethylenically unsaturated carboxylic acid, optionally with up to 30, preferably 0–20 parts of a different ethylenically unsaturated monomer which confers hydrophilicity to the polymer and enhances its solubility in aqueous liquids, the quantity of ethylenically unsaturated acid being between about 0.2 and 3.0 preferably from 0.4–1.3 meq/g. of polymer, and
(d) 10–60, preferably 20–50 parts by weight of units of Formula V, and total of (a), (b), (c), and (d) being 100.

Still more preferably, the polymer is one wherein:
(a) is selected from one or more of ethyl acrylate, butyl acrylate, 2-ethylhexyl acrylate, sec-butyl acrylate, isobutyl acrylate, ethyl methacrylate, isopropyl acrylate, methyl methacrylate, butyl methacrylate, lauryl methacrylate, and isobutyl methacrylate,
(b) is selected from one or more of styrene, acrylonitrile, and vinyl toluene,
(c) is selected from one or more of acrylic acid, methacrylic acid, maleic acid, and itaconic acid, and is present in an amount of from 3 to 10 parts, and
(d) is present in the amount of between about 20 and 50 parts,
the polymer consisting essentially of (a), (b), (c), and (d).

In a preferred polymer, in Formula V, n is 2, $R^3$ is —H, —CH$_3$, or —CH$_2$CH$_3$, and $R^4$ is the residue of one or more of the drying oil acids selected from tung oil acids, linseed oil acids, dehydrated castor oil acids, safflower oil acids, conjugated safflower oil acids, soybean oil acids and oiticica oil acids. Combinations of drying oil acids are often advantageous.

The backbone polymer, prior to esterification with the hydroxyamide, is a water-insoluble vinyl polymer containing the requisite proportion of carboxyl (—COOH) groups as described herein. The backbone polymers per se are well known in the art and form no part of the present invention.

The preferred backbone polymers are those of vinyl addition polymer type, including as an essential component the $\alpha,\beta$-unsaturated carboxylic acid, preferably acrylic acid or methacrylic acid. Other useful copolymerizable acids are named in U.S. Pat. Nos. 3,098,760 and 3,261,796, additional examples being given below.

To amplify, the unsaturated carboxylic acid may be a simple monocarboxylic acid, a polycarboxylic acid, or may be a partial ester or half amide of such an $\alpha,\beta$-unsaturated polycarboxylic acids, and salts thereof with a volatile base such as ammonia, or with a volatile monamine, which form water-soluble salts with the copolymer acid, such as dimethylamine, triethylamine, diethanolamine, triethanolamine, morpholine, N-methyl morpholine, picoline, and the like, but not polyamines, which may interact with the metal of the siccative. Examples of copolymerizable ethylenically unsaturated monocarboxylic or polycarboxylic acids are sorbic, acryloxyacetic, acryloxypropionic, cinnamic, vinyl furoic, α-chlorosorbic, methacryloxypropionic, methacryloxyacetic, p-vinylbenzoic, acrylic, methacrylic, maleic, fumaric, aconitic, atropic, crotonic, and itaconic acids, or mixtures thereof, with itaconic acid and the α,β-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate and butyl acid maleate. Such partial esters, as well as partial amides, are considered to be "α,β-unsaturated monocarboxylic acids," and the term as used herein includes such esters and amides.

The term "vinyl monomer" as used herein means a monomer comprising at least one of the following groups:

vinylidene: $CH_2=C<$
vinyl: $CH_2=CH-$, and
vinylene: $-CH=CH-$, whether homopolymerizable or not, giving units corresponding to X and to Formula II. Examples are the α,β-ethylenically unsaturated monocarboxylic acids and esters and amides thereof, α,β-ethylenically unsaturated aldehydes, α,β-ethylenically unsaturated dicarboxylic acids and esters, amides, half esters, and half amides thereof, α,β-ethylenically unsaturated nitriles, hydrocarbons such as α-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<) groups, and halogen, hydroxyalkyl, or aminoalkyl substituted derivatives thereof.

Specific examples of suitable monomers which may be copolymerized to obtain the backbone polymers for use according to the invention in addition to the unsaturated acid monomers and esters thereof with alkanols having one to 20 carbon atoms, such as methanol, ethanol, butanol, pentadecanol and the like, are acrolein, methacrolein, ethylene, propylene, isobutene, butadiene, isoprene, chloroprene, styrene, vinyl toluene, vinyl methyl ether, vinyl isobutyl ether, vinyl chloride, vinyl bromide, vinylidene chloride, vinyl sulfide, vinyl acetate, vinyl propionate, the vinyl pyridines; primary amino compounds such as β-aminoethyl vinyl ether, aminopentyl vinyl ether; secondary amino-containing compounds such as t-butylaminoethyl methacrylate; tertiary amino containing compounds such as dimethylaminoethyl methacrylate, and the allied amine salts such as the chloride or hydroxide, and ureido monomers such as are disclosed in U.S. Pat. No. 3,356,627 to Scott. Copolymers and graft, block, or segmented polymers are included. Conventional methods of obtaining the backbone polymers are utilized.

Among the drying oils from which the drying oil fatty acid amide is derived are linseed, tung, tall, safflower, conjugated safflower, isano, soya, dehydrated castor, oticica, menhaden, and similar oils, as well as acids not derived from drying oils and of a synthetic origin, with a carbon chain preferably of about 20 carbon atoms or less and having unsaturation therein which can be caused to air cure in a manner analogous to linseed oil. The preferred oils are those in which the major component contains two or more sets of olefinic unsaturation, in either a conjugated or alternating occurrance, including in addition to oiticica and dehydrated castor oils, those which contain linoleic and/or linolenic acids as the predominant ones.

The preparation of the fatty acid hydroxyamide is carried out by well known procedures, as is the esterification of the carboxyl groups on the polymeric backbone by the hydroxyamide. Exemplary of publications describing these are *The Journal of the American Oil Chemists' Society*, Volume 46, pages 355-364, published in 1969, which discloses the use of diethanolamine to produce fatty acid hydroxyamide rather than the monoethanolamine which is preferred in the present invention, German Pat. No. 1,940,471, and Belgian Pat. No. 757,271 and corresponding U.S. Pat. No. 3,590,016 noted above.

The solvents used in the polymerization of the soluble polymers may be such organic solvents and mixtures thereof such as benzene, toluene, xylene, solvent naphthas of aliphatic, aromatic, or naphthenic type such as mineral spirits, ethers, esters, acetone, dioxane, etc. Preferred solvents are the monoalkyl ($C_1$–$C_4$) ethers of ethylene glycol, diethylene glycol, or propylene glycol, sold under the trademarks "Carbitol", "Cellosolve", and "Propasol". Of course, other modes of polymerization can be used. The amount of solvent in the polymer is from 0% to 80% based on polymer solids, preferably from 10% to 65%.

Suitable water reducible alkyd resins and a process of preparing the same are described in U.s. Pat. No. 4,051,089, British Pat. No. 1,088,374 and the *Journal of Coatings Technology*, Vol. 48, No. 623, pp. 37–42. In general these resins are the product of a drying oil fatty acid or drying oil fatty acid triglyceride, a polyol and a polyfunctional carboxylic acid or anhydride. More specifically, the alkyd resin compositions comprise from about 20–50 wt. %, based on the total weight of the reactants of the fatty acid or fatty acid triglyceride; from about 20–50 wt. %, based on the total weight of reactants, of a polyol and from about 20–50 wt. %, based on the total weight of the reactants of a polyfunctional carboxylic acid or anhydride. The final polymer based on the above-described reactants should preferably have an acid number in the range of from about 10 to about 165 (i.e., 0.2–3 meq/g. of polymer), preferably 0.4–1.3 meq of acid per gram of resin. Additionally, the final polymer may be neutralized or partially neutralized by any suitable means, e.g., by triethylamine or ammonia.

Any suitable oxidatively curable drying oil fatty acid or drying oil fatty acid triglyceride may be used in preparing alkyd resins useful in the invention; linoleic and linolenic acids are suitable. Specially preferred are fatty acid or fatty acid triglycerides derived from natural sources such as soya oil, safflower oil, tall oil, linseed oil, tung oil, and the like. Accordingly, suitable triglycerides have from about 30–60 carbon atoms per molecule ($C_{30}$–$C_{60}$).

Polyols suitable for the invention should preferably contain from about 2 to about 6 hydroxy groups, e.g., glycerine, propylene glycol, trimethlylol ethane, trimethylol propane, pentaerythritol, neopentyl glycol and the like. Polymeric polyols such as polyethylene glycol are also suitable.

Polyfunctional carboxylic acids or anhydrides may both be advantageously used in these compositions. In general the acid or anhydride should contain from 8–12 carbon atoms, that is it should be a $C_8$–$C_{12}$ polyfunctional carboxylic acid or anhydride. Representative compounds are isophthalic, phthalic and terephthalic acids, and phthalic anhydride, trimellitic acid and trimellitic anhydride.

In general, the water reducible alkyd resins embodied in this invention are prepared by placing appropriate amounts of a polyol, a fatty acid or fatty acid triglyceride, and a polyfunctional carboxylic acid or anhydride in a suitable reaction vessel, applying heat in excess of approximately 200° C. After several hours reaction additional polyfunctional carboxylic acid or anhydride is added to the reaction mixture. The reaction is continued until the mixture has an acid number from about 30 to about 100 whereupon it is cooled and then diluted with a suitable solvent. Preferred solvents are the monoalkyl ($C_1$–$C_4$) ethers of ethylene glycol, diethylene glycol or propylene glycol. Additionally, the alkyd resins so prepared may be neutralized in any suitable manner with any suitable amine such as for example ammonia, triethylamine or N,N-dimethylethanolamine and distilled water to provide a clear resin having a substantially neutral pH, i.e., approximately 6.5–7.5.

Any of the conventional driers or siccatives, such as the linoleates, naphthenates, and resinates of cobalt, zirconium, manganese, lead, cerium, chromium, iron, nickel, uranium, and zinc are suitable. Inorganic acid salts can also be used.

The amount of drier, if used, based on the weight of the resin can be as low as 0.01% to as high as 3% or more. Good results are often obtained with combinations of driers, such as zinc naphthenate and cobalt naphthenate in quite small amounts, for example, from 0.01% to 0.5% of the zinc naphthenate together with 0.01% to 0.1% cobalt naphthenate are particularly useful. $Co^{++}$ as cobaltous acetate is also useful, alone or with compounds providing $Mn^{++}$, $Zn^{++}$, $Zr^{++}$, or $Pb^{++}$.

Suitable latex polymers for the top coat floor paint are addition polymers obtained by emulsion polymerization. The most important of these dispersions used in making water-based paints are polymers including homopolymers and copolymers of: (1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate 2-ethylhexyl acrylate, methyl methacrylate, ethyl methacrylate and butyl methacrylate; and (3) mono- and di-ethylenically unsaturated hydrocarbons, such as ethylene, isobutylene, styrene, and aliphatic dienes such as butadiene, isoprene, and chloroprene.

Poly(vinyl acetate) and copolymers of vinyl acetate with one or more of ethylene, vinyl chloride, vinylidene chloride, styrene, vinyltoluene, acrylonitrile, methacrylonitrile, one or more of the acrylic and methacrylic acid esters mentioned above are well known as the film-forming component of aqueous base paints. Similarly, copolymers of one or more of the acrylic or methacrylic acid esters mentioned above with one or more of the following monomers: vinyl acetate, vinyl chloride, vinylidene chloride, styrene, vinyltoluene, acrylonitrile and methacrylonitrile are also more or less conventionally employed in aqueous base paints. Copolymers of ethylene, isobutylene and styrene, one or more esters, nitriles or amides of acrylic acid or of methacrylic acid or with vinyl esters, such as vinyl acetate and vinyl chloride, or with vinylidene chloride are also used. The diene polymers are generally used in aqueous base paints in the form of copolymers with one or more monomers such as styrene, vinyltoluene, acrylonitrile, methacrylonitrile, and the above mentioned esters of acrylic acid or methacrylic acid. It is also quite common to include a small amount, such as ½ to 5% or more of an acid monomer in the monomer mixture used for making the copolymers of all three general types mentioned above by emulsion polymerization. Acids used include acrylic, methacrylic, itaconic, aconitic, citraconic, crotonic, maleic, fumaric, the dimer of methacrylic acid, and so on.

These aqueous dispersions may be made using one or more emulsifiers of anionic, cationic, or non-ionic type. Mixtures of two or more emulsifiers regardless of type may be used, except that it is generally undesirable to mix a cationic with an anionic type in any appreciable amounts since they tend to neutralize each other. Furthermore, many cationic types of emulsifier are incompatible with the polymers of the invention. The amount of emulsifier may range from about 0.1 to 5% by weight of sometimes even more based on the weight of the total monomer charge. When using a persulfate type of initiator, the addition of emulsifiers is often unnecessary and this omission or use of only a small amount, e.g., less than about 0.5%, of emulsifier, may sometimes be desirable from the cost standpoint (elimination of expensive emulsifier), and less sensitivity of the dried coating or impregnation to moisture, and hence less liability of the coated substrate to be affected by moisture, which, for instance, would produce a coating less liable to swelling or softening, particularly when subjected to humid atmospheres. The average particle size or diameter of these dispersed polymers may be from about 0.03 to 3 microns or even larger. The particle size, whenever referred to herein, is the "weight average diameter". This number, expressed in microns, is determined using the ultra-centrifuge. A description of the method can be found in the Journal of Colloid Science 15, pp. 563–572, 1960 (J. Brodnyan). In general, the molecular weight of these emulsion polymers are high, e.g., from about 100,000 to 10,000,000 viscosity average, most commonly above 500,000.

To assist those skilled in the art to practice the present invention, the following modes of operation are suggested by way of illustration, parts and percentages being by weight and the temperature in °C. unless otherwise specifically noted.

In the examples the abbreviations for monomers have the folowing meanings:

| | |
|---|---|
| BA - butyl acrylate | HEMA - hydroxyethyl |
| MMA - methyl methacrylate |  methacrylate |
| AA - acrylic acid | MAA - methacrylic acid |
| S - styrene | BMA - butyl methacrylate |
| AN - acrylonitrile | EA - ethyl acrylate |
| | iBMA - isobutyl methacrylate |

The following abbreviations are for the esterified units of Formula V of the specified fatty acid amine, of N—methyl—N—hydroxyethyl amide as follows:
  MHELAE—linseed oil acids
  MHESOYAE—soybean oil acids
  MHESAFAE—safflower oil acids
  MHEDCAE—dehydrated castor oil acids MHETAE—tung oil acids
MHESTAE—stearic acid-a non-drying acid
The following abbreviations are also utilized in the examples:

HELAE—N-hydroxyethyl linseed oil acid amide ester

HESAFE—N-hydroxyethyl safflower oil acid amide ester unit

Cure rate is a function of drying oil type. Cure efficiency is also a function of drying oil type and quantity. Some polymers containing styrene or acrylonitrile are shown to cure at a slightly reduced rate; analogous polymers containing hydroxyethyl methacrylate (HEMA) exhibit an enhanced cure rate.

The following gives a sample calculation for determining the relative weight ratios of mer units in the final polymer.

SAMPLE CALCULATION

This illustrates the preparation of 10BA/46 MMA/40MHESOYAE/4MAA by reacting the carboxy-containing backbone polymer with N-methyl-N-hydroxyethyl soybean oil acid amide.

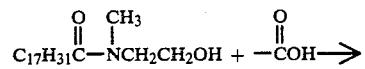

Average Molecular Weight = 337

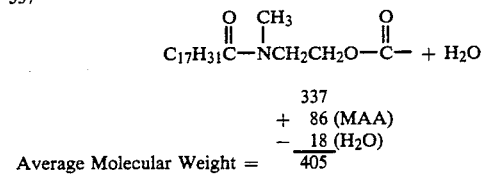

$$\begin{array}{r} 337 \\ + \ 86 \ (MAA) \\ - \ 18 \ (H_2O) \\ \hline 405 \end{array}$$

Average Molecular Weight =

A prepolymer of composition 14.60BA/67.13-MMA/18.27MAA (calculated Tg=8° C.) is reacted with 48.57%, on the basis of prepolymer weight, of N-methyl-N-hydroxyethyl soybean oil acid amide (MHESOYA). Thus, 100 g. of prepolymer is reacted with 48.57 g. of N-methyl-N-hydroxyethyl soybean oil amide.

48.57/337 = 0.1441 moles amide.
86×0.1441 = 12.40 gms. MAA in 0.1441 moles.
18×0.1441 = 2.59 gms. H₂O in 0.1441 moles.
Wt. of MHESOYAE units of Formula V
48.59+(12.40-2.59) = 58.40 g. Final Composition

|  | gms | % |
|---|---|---|
| BA | 14.60 | 10 |
| MMA | 67.13 | 46 |
| MAA 18.27 − 12.40 = | 5.87 | 4 |
| MHESOYAE | 58.40 | 40 |
|  | 146.00 |  |

EXAMPLE 1

10BA/46MMA/40MHESOYAE/4MAA

A monomer mixture of the following materials was prepared:

|  | Parts |
|---|---|
| Butyl Acrylate | 139.1 |
| Methyl Methacrylate | 639.8 |
| Methacrylic Acid | 174.1 |

An initiator solution of the following materials was prepared:

|  | Parts |
|---|---|
| Butyl Carbitol ® | 49.2 |
| t-Butyl perbenzoate (85% active) | 11.2 |

The following materials were charged into a reaction vessel fitted with a stirrer, condenser, nitrogen sweep and two gradual addition devices:

|  | Parts |
|---|---|
| Butyl Carbitol | 420.0 |
| Monomer Mixture | 149.8 |
| Initiator Solution | 4.6 |

The mixture was heated to 150° C. and held at this temperature for ten minutes after which the remainder of the monomer mixture and the initiator solution were added gradually over four hours while maintaining 150°±2° C. Following this addition the temperature was held for ten minutes then a mixture of 2.2 parts t-butyl perbenzoate (85%), and 8.1 parts of butyl Carbitol was added to the batch. After an additional ten minute hold, a mixture of 462.9 parts of N-methyl-N-hydroxyethyl soybean oil fatty acid amide (MHESOYA) and 74.1 parts of glycerol[1] was added slowly over 15 minutes while maintaining 150° C. This temperature was maintained for six hours while approximately 30 parts of a clear liquid was distilled from the batch. Next the batch was cooled to 110° C. and a mixture of 39.5 parts 28% aqueous ammonia and 1798 parts of dionized water was added to the batch while maintaining good agitation. After cooling to room temperature, the batch was removed from the reaction vessel and packaged in a glass container.

[1]Glycerol is a by-product of the MHESOYA preparation and is not necessary for this process. It can be removed by a water wash.

The product of this process was a clear amber solution with a solids content of 37.0%, a viscosity of 110,000 centipoise, and a copolymer acid titer of 0.754 meq/g T.S. (total solids). By "solids" is meant the non-volatile materials in the composition which eventually form a part of the cured coating. After dilution to 20% solids with an 80/20 water/butyl Carbitol mixture the polymer solution had a viscosity of 1,000 cps.

The solution viscosities of water-soluble copolymers can be markedly reduced by the addition of a cosolvent. It has been concluded that (a) the solubility parameter and hydrogen bonding class of a cosolvent have no relationship to the efficiency of the cosolvent in reducing solution viscosity, and (b) among the better cosolvents (acetonitrile, isopropanol, isobutanol, acetone, methyl ethyl ketone) all are approximately equally effective in reducing solution viscosity. Other useful cosolvents include butyl "Cellosolve", butyl "Carbitol", "Propasol" B, "Propasol" P, and diacetone alcohol.

It is important to promptly cool the batch after the esterification is completed. The reason is that, if the batch is not promptly cooled, gelation may occur. The gelatin tendency of a batch can be reduced by lowering the temperature of the esterification reaction. Although longer reaction times are required at lower reaction temperatures the gel-free time is increased. The gel-free time is the time from the completion of the esterification reaction until the onset of gelatin. Other factors contributing to gel-free time are copolymerized acid content, in that a lower content of acid gives a longer gel-free time, and the total solids, in that the lower solids content products have a longer gel-free time. Another factor is the nature of the drying oil acid. The order of susceptibility to gelation is as follows: dehydrated castor>tung->linseed=safflower≧soy≧stearic. Additives which will quench the gelation effect are sometimes useful. These additives include carboxylic acids and aniline. Examples of the acids are: monochloroacetic acid and benzoic acid.

EXAMPLE 2

10BA/46MMA/40MHESOYAE/4MMA (lower molecular weight)

The method of Example 1 was repeated with the exception that the t-butyl perbenzoate (85%) in the initiator solution was increased to 28.6 parts.

The product of this process was a clear amber solution with a solids content of 37.1%, a viscosity of 23,000 centipoise, and a copolymer acid titer of 0.742 meq/g T.S. After dilution to 20% solids with an 80/20 water/butyl Carbitol mixture the polymer solution had a viscosity of 200 cps.

EXAMPLE 3

10BA/46MMA/40MHESOYAE/4MMA (higher molecular weight)

The method of Example 1 was repeated with the exception that the t-butyl perbenzoate (85%) in the initiator solution was decreased to 2.8 parts. (The lower level of initiator is known in the art to increase molecular weight.)

The product of this process was a clear amber solution with a solids content of 38.7%, a viscosity of 1,000,000 centipoise and a copolymer acid titer of 0.643 meq/g T.S. After dilution to 20% solids with an 80/20 water/butyl Carbitol mixture the polymer solution had a viscosity of 10,000 cps.

EXAMPLE 4

25BA/23MMA/40MHESOYAE/12MAA

The metjhod of Example 1 was repeated with the exception (1) that the monomer mixture was composed of the following:

|  | Parts |
|---|---|
| Butyl acrylate | 347.8 |
| Methyl methacrylate | 320.0 |
| Methacrylic Acid | 285.1 | and (2) the reactive mixture was held at 150° C. for thirty minutes following addition of the N-methyl-N-hydroxyethyl soybean oil fatty acid amide.

The product of this process was a clear amber liquid with a solids content of 37.2%, a solution viscosity of 180,000 centipoise, and a copolymer acid titer of 1.41 meq/g T.S. After dilution to 20% solids with an 80/20 water/butyl Carbitol mixture the polymer solution and a viscosity of 800 cps.

EXAMPLE 5

The polymers prepared in Examples 1-4 plus Kelsol TM 3902, a commercial water dilutable alkyd (acid titer 0.92 meq/g. T.S.), were each diluted to an application viscosity of 100-500 cps. The solvent composition in all cases was an 80/20 (w/w) mixture of water and butyl Carbitol. Approximately 0.1% $Co^{++}$ (as cobalt naphthenate) was added to these formulations. After an overnight equilibration period each of these formulations was applied with a brush at their natural spread rates to a moistened concrete test block (4"×6"), the surface of which had been trowelled to produce a typical substrate. The aqueous tie coat was applied at the rate of about 9 g. of solution per ft.$^2$ (0.0929 m$^2$) of concrete area, and the latex applied to give a dry paint thickness of about 0.003 in. (0.00762 cm). The concrete samples used were prepared from 3 parts gravel, 2 parts sand, and 1 part Portland cement, by weight. They were given a smooth finish with a steel trowel, and autoclave cured for 28 days. The samples were 1"×4"×6" (2.54 cm×10.16 cm×15.24 cm.). If two coats were to be evaluated, the second tie coat was applied after an overnight drying period. Approximately twelve hours after application of the final tie coat, the test blocks were coated with one coat of the following latex floor paint formulation.

| Materials | Formulation 336 High Sheen Gray | |
|---|---|---|
|  | Pounds | Gallons |
| Charge the following: | | |
| Pigment dispersant | 7.5 | 0.82 |
| Surfactant | 2.0 | 0.24 |
| Anti-Foam | 2.0 | 0.20 |
| Water | 75.2 | 9.11 |
| Lampblack Dispersion | 30.0 | 2.46 |
| Titanium Dioxide | 214.2 | 6.12 |
| Grind with Cowles ® Dissolver at 6000 RPM for 20 Minutes; Decrease speed and add: | | |
| Water | 24.5 | 2.98 |
| Propylene Glycol | 49.8 | 5.33 |
| Butyl Cellosolve ® | 24.4 | 3.24 |
| Super-Ad-It$^{TM}$ | 1.0 | 0.12 |
| Mix 5 minutes with good agitation and add: | | |
| Acrylic Laxex (46% T.S.)* | 503.4 | 56.78 |
| Aluminum Oxide | 25.0 | 0.68 |
| Hydroxyethyl Cellulose (3% solution in water) | 63.3 | 7.65 |
| Total | 1022.3 | 95.73 |

|  | Formulation 336 |
|---|---|
| Physical Constants: | |
| Pigment Volume Content | 21.7% |
| Total Solids | 46.0% |
| Initial Viscosity (K.U.) | 60 to 65 |
| 60° Gloss | 47 |

*Emulsion polymer of approximately 50/49/1 methyl methacrylate/butyl acrylate/methacrylic acid by weight having an approximate particle size of 0.1μ and a Mv of about 750,000 as determined by gel permeation chomatography.

Two weeks drying time at room temperature (20°-22° C.) was allowed before evaluation of the test blocks. In all cases the general appearance of the top coat was unaffected by any of the tie coatings.

Table I lists the evaluation of several tie coat systems. Commercial latex based and commercial alkyd floor paints applied without a tie coating were used as controls.

The following test methods were utilized:

Adhesion—The test blocks were soaked in water for one hour then the paint film was crosshatched with a sharp knife. With the aid of the knife blade the paint film was scraped back. The results are a subjective rating of the ease of peel of the film from the surface. (10—very strong adhesion; 0—very poor adhesion).

Tire pick-up resistance—The painted surface of the test blocks were soaked with a moist cheesecloth for one hour. Then a section of a rubber tire, which had been soaked in hot running water (60° C.) for an hour, was clamped tightly to each paint surface to be tested and the entire apparatus placed in a 60° C. oven for 90 minutes.

Spalling Resistance—The test blocks were soaked in water for three days then subjected to five freeze-/thaw/water soak cycles. The results are evaluated by subjectively rating the paint film appearance (10=no change; 0—severe blistering and flaking).

Adhesion After Spalling—Same as the adhesion test except the blocks were subjected to the wet freeze-/thaw/soak cycling described under spalling before evaluation.

Solvent Resistance—A piece of cheesecloth moistened with the solvent to be evaluated was placed over the test paint and covered with a watch glass. After two hours the cheesecloth was removed and the paint films tested and evaluated subjectively (10—no change; 8—slight softening of the film; 4—severe softening of the film; 0—film dissolves).

ciency of binder at the surface. The higher molecular weight analog (Example 2) is lower in adhesion because not enough binder can be applied (because of viscosity limitations) to give best results in binding the surface. The higher copolymer acid analog (Example 4) initially provides good adhesion but under conditions of prolonged wetting and mechanical stress by repeated freezing and thawing (Spalling test) the adhesion is reduced. Under microscopic examination it is obvious that this higher acid tie coating becomes severely swollen by these prolonged wet, alkaline conditions. Thus a maximum limit of acid is a desired feature. Of course, if the non-acid comonomers are particularly hydrophobic, more acid monomer can be tolerated. Under indoor conditions of use, the higher unsaturated acid monomer levels are not ordinarily disadvantageous. Additionally, the solvent resistance of the tie coated systems is improved, probably because the improved adhesion, by reason of the acid content, reduces the rate of solvent swelling, a known phenomenon.

EXAMPLE 6

10EA/46MMA/40MHELAE/4MAA

The method of Example 1 was repeated with the following changes: (1) ethyl acrylate was used instead of butyl acrylate in the monomer mixture (2) N-methyl-N-hydroxyethyl linseed oil fatty acid amide was used instead of N-methyl-N-hydroxyethyl soybean oil fatty acid amide.

TABLE I

| | | | | Tie Coat & Top Coat | | | | | | |
|---|---|---|---|---|---|---|---|---|---|---|
| Tie Coat | | | | | Tire | | Adhesion | Solvent Resistance | | |
| Sample | Remarks | Appln. % T.S. | No. of Tie Coats | Adhesion (Knife) | pick-up resis. | Spalling Resis. | after Spalling | Gasoline | 10% NaOH | Varsol |
| Ex. 1 | Typical tie | 15 | 1 | 8 | 6 | 10 | 8 | 7 | 7 | 7 |
| | coat | 20 | 1 | 8 | 7 | 9 | 7 | 8 | 7 | 7 |
| | | 20 | 2 | 8 | 9 | 10 | 8 | 7 | 8 | 8 |
| Ex. 2 | Lower molecular | 20 | 1 | 5 | 4 | 10 | 9 | 7 | 8 | 9 |
| | weight | 20 | 2 | 8 | 6 | 9 | 7 | 7 | 6 | 7 |
| | | 25 | 1 | 8 | 4 | 8 | 9 | 7 | 9 | 9 |
| Ex. 3 | Higher molecular | 10 | 1 | 3 | 3 | 5 | 7 | 7 | 8 | 8 |
| | weight | 10 | 2 | 5 | 5 | 6 | 7 | 8 | 8 | 8 |
| Ex. 4 | Increased | 20 | 1 | 8 | 6 | 1 | 2 | 7 | 8 | 7 |
| | copolymer acid | 20 | 2 | 8 | 5 | 2 | 2 | 8 | 8 | 7 |
| Ex. 5 | Water soluble | 20 | 1 | 5 | 5 | 9 | 5 | 6 | 6 | 6 |
| | alkyd (Kelsol | 20 | 2 | 6 | 9 | 9 | 3 | 8 | 7 | 7 |
| | 3902) | 25 | 1 | 6 | 2 | 10 | 7 | 8 | 9 | 9 |
| | | 25 | 2 | 8 | 8 | 10 | 6 | 8 | 9 | 8 |
| | No tie coat - Latex top coat only (Formulation 336, supra) | | | 3 | 0 | 10 | 5 | 6 | 6 | 5 |
| | No tie coat - Commercial solvent-based alkyl floor paint only (Dutch Boy ® Porch and Floor Gloss Finish, Battleship Gray) — applied to dry concrete. | | | 10 | 10 | 10 | 8 | 3 | 1 | 9 |

From the data in Table I it is obvious that all of the tie coatings markedly improve the adhesion of the latex top coat paint as measured by the knife adhesion and tire pick-up tests. In general the more tie coating applied (more coats, higher applications total solids or "T.S.") the better the adhesion of the top coat. The polymer prepared in Example 1 has the best overall adhesion. The lower molecular weight analog (Example 2) and the Kelsol 3902 resin (also of lower molecular weight) are slightly less effective, probably either because these polymers are mechanically weaker or because they penetrate the concrete too much, resulting in a deficiency The product of this process was a clear amber solution with a solids content of 37.2%, a viscosity of 80,000 centipoises and a copolymer acid titer of 0.720 meq./gm T.S. After dilution to 20% solids with an 80/20 water-/butyl Carbitol mixture the polymer solution had a viscosity of 700 centipoise.

EXAMPLE 7

10 2-EHA/31MMA/15S/40MHESOYAE/4MAA

The method of Example 1 was repeated with the exception that the monomer mixture was composed of the following:

|  | Parts |
| --- | --- |
| 2-Ethyl-Hexyl acrylate | 139.1 |
| Methyl methacrylate | 431.2 |
| Styrene | 208.6 |
| Methacrylic Acid | 174.1 |

The product of this process was a clear amber solution with a solids content of 37.4, a viscosity of 180,000 centipoise, and a copolymer acid titer of 0.751 meq./gm. T.S. After dilution to 20% solids with an 80/20 water/butyl Carbitol mixture the polymer solution had a viscosity of 1200 centipoise.

EXAMPLE 8

10BA/10AN/36MMA/10MHETAE/30MHEDHCAE/4MAA

The method of Example 1 was repeated with the exceptions that (1) the monomer mixture was composed of the following:

|  | Parts |
| --- | --- |
| Butyl acrylate | 139.1 |
| Acrylonitrile | 139.1 |
| Methyl Methacrylate | 500.7 |
| Methacrylic Acid | 174.1 | and (2) a mixture of 115.7 parts of N-methyl-N-hydroxyethyl tung oil fatty acid amide and 347.2 parts of N-methyl-N-hydroxyethyl dehydrated castor oil fatty acid amide was utilized instead of 362.7 parts of N-methyl-N-hydroxyethyl soybean oil fatty acid amide.

The product of this process was a clear amber solution with a solids content of 37.5%, a viscosity of 120,000 centipoise, and a copolymer acid titer of 0.748 meq./gm. T.S. After dilution to 20% solids with an 80/20 water/butyl Carbitol mixture the polymer solution had a viscosity of 1100 centipoise.

EXAMPLE 9

10BA/46MMA/40MHESOYAE/4AA

The method of Example 1 was repeated with the exceptions that (1) the monomer mixture was composed of the following:

|  | Parts |
| --- | --- |
| Butyl acrylate | 141.0 |
| Methyl methacrylate | 650.7 |
| Acrylic acid | 101.0 |

(2) the amount of N-methyl-N-hydroxyethyl-soybean oil fatty acid amide was increased to 487.9 parts and (3) the amount of 28% aqueous ammonia was increased to 47.9 parts.

The product of this process was a clear amber solution with a solids content of 38.0%, a viscosity of 9,800 centipoise, and a copolymer acid titer of 0.602 meq./gm. T.S. After dilution to 20% solids with a water/butyl Carbitol mixture the polymer solution had a viscosity of 180 centipoise.

EXAMPLE 10

Water Soluble Alkyd A

The following were charged to a reaction kettle and heated rapidly with agitation to 180° C. then slowly over three hours to 240° C.:

|  | Parts |
| --- | --- |
| Linseed oil fatty acids | 357 |
| Trimethylolpropane | 335 |
| Isophthalic Acid | 299 |

The mixture was held at this temperature until an acid number less than 10 was attained. The reaction mixture was then cooled to 180° C. and 99 parts of trimellitic anhydride was added. The temperature was maintained at 180° C. until an acid number of 50 was attained, then cooled to 100° C. and diluted with a mixture of 200 parts butyl Cellosolve, 800 parts water and 91 parts of triethylamine.

The product of this process was a clear amber solution with a solids content of 47.8% and a viscosity of 6,000 centipoise. After dilution to 20% solids with a water/butyl Cellosolve mixture the polymer solution had a viscosity of 90 centipoise.

EXAMPLE 11

Water Soluble Alkyd B

The following were charged to a reaction kettle:

|  | Parts |
| --- | --- |
| Soybean oil | 1105 |
| Glycerine | 945 |
| Carbowax ® 600 | 600 |

The mixture was heated under nitrogen and with good agitation to 205° C. and 1.5 parts of litharge were added. The temperature was slowly raised to 230° C. and maintained for 40 minutes. The reaction mixture was then cooled to 210° C. and 2350 parts of isophthalic acid were added. The reaction temperature was gradually raised to 225° C. and maintained until the isophthalic acid had completely dissolved in the reaction mixture. The temperature was then reduced to 215° C. and held until an acid number of 58 was attained. The reaction mixture was then cooled to 100° C. and diluted with a mixture of 420 parts butyl Cellosolve, 420 parts t-butyl alcohol, 3900 parts water and 265 parts of 28% aqueous ammonia.

The product of this process was a clear amber solution with a solids content of 49.8% and a viscosity of 9,000 centipoise. After dilution to 20% solids in an 80/20 weight ratio of water/butyl Carbitol the polymer solution had a viscosity of 140 cps.

EXAMPLE 12

The polymers prepared in Examples 6–11 were diluted to an application viscosity of 100–500 centipoise and 0.10% Co++ was added. The solutions were then utilized as tie coatings to prepare a set of test blocks in the manner described in Example 5. The results of the knife adhesion test on these samples is given in Table II. From the data in Table II it is obvious that all of the polymers prepared in Examples 6-11 when utilized as the coatings markedly improve the adhesive of the latex top coat paint.

Table II

| Sample | Application % T.S. | No. of Tie Coats | Adhesion (Knife) | Remarks |
|---|---|---|---|---|
| Example 6 | 20 | 1 | 8 | |
| Example 7 | 15 | 1 | 6 | |
| Example 8 | 15 | 1 | 7 | |
| Example 9 | 20 | 1 | 5 | |
| Example 10 | 20 | 1 | 7 | |
| Example 11 | 20 | 1 | 6 | |
| — | — | 0 | 3 | Latex top coat only |

EXAMPLE 13

In general the hydrolytic stability of the water dilutable acrylic copolymers is expected to be better than the water dilutable alkyds especially on long term exposure to a very basic substrate such as concrete. Additionally, the property loss with hydrolysis is expected to be less for the acrylic copolymer because hydrolysis results in side cleavage only which has only minimal effect on the cured polymer properties; whereas hydrolysis of the alkyd involves backbone cleavage and probable loss in polymer performance. Hydrolysis data on aqueous solutions of both a preferred acrylic copolymer and a typical water soluble alkyd which demonstrates the better hydrolytic stability of the acrylic product are given below.

| Sample | T.S. | Solvent | Initial pH | Initial Polymer Acid[1] | +10 days/60° C. pH | +10 days/60° C. Polymer Acid[1] | Increase in Acid Titer |
|---|---|---|---|---|---|---|---|
| Ex. #1 | 20% | Water/butyl Carbitol (80/20) | 8.5 | 0.770 | 8.1 | 0.822 | 6.8% |
| Kelsol 3902 | 20% | Water/butyl Carbitol (80/20) | 8.2 | 0.919 | 7.9 | 1.176 | 28.0% |

[1]meq/g polymer solids

We claim:

1. In the method of painting concrete with a latex paint wherein a primer is used, the improvement comprising priming the concrete with an aqueous solution of a salt of an oxidatively curable resin selected from (A) water reducible alkyds and (B) a linear acrylic addition polymer having pendant groups derived from drying oil fatty acids, oxidatively curing the primer coating, applying a latex paint coating to the primed surface, and drying the latex paint.

2. The method of claim 1 in which the aqueous solution contains a liquid organic solvent miscible with water.

3. The method of claim 2 in which said solvent is present in an amount of up to 50% of the combined weight of the solvent in water.

4. The method of claim 3 in which the primer polymer has a structure.

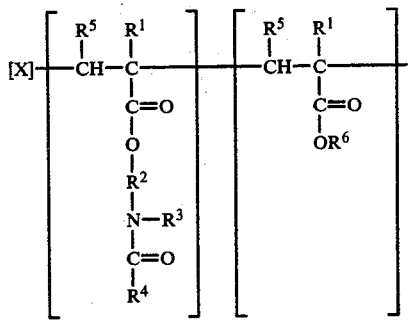

wherein

R[1] is H, a lower alkyl radical having one to five carbon atoms, halogen, —CN, or —CH$_2$COOR, —COOR, or —CH$_2$COOH, R being a lower alkyl radical having from one to eight carbon atoms;

R[2] is (CR[7]$_2$)$_n$ wherein R[7] is —H or —CH$_3$ and n is 1 or 2;

R[3] is H, or a lower alkyl radical having from one to 8 carbon atoms;

R[4] is an unsaturated, air-curable alkyl radical from a drying oil acid;

R[5] is H, —COOH, —CONH$_2$, or —COOR, wherein R is as above;

R[6] is H, or an aliphatic or cycloaliphatic radical having from one to 20 carbon atoms; and X is optional and when present is derived from at least one vinyl monomer different than the residues depicted;

the units in brackets being in any order, portions of the R[6] radicals being as hereinafter defined in units of the formula:

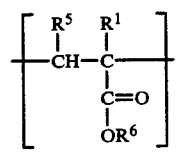

R[6] being H in a sufficient number of units of Formula II to provide the polymer with a carboxy content of 0.2–3.0 meq/g. of polymer, the quantity of carboxy groups being sufficient, when in the form of salt groups with said amine or ammonia, to confer solubility in a solvent composed primarily of water, the amount of carboxy-containing units of Formula II wherein R[6] is H being between 2 and 20 parts by weight of the total polymer; optionally a portion of the radical R[6] in the units of Formula II being at least one aliphatic or cycloaliphatic radical and being selected so that the units are derived from at least one ester which when homo- polymerized gives a high molecular weight polymer having a T$_g$ of between −80° C. and 120° C., said ester units forming up to 80 parts by weight of the polymer; the polymer having between about 10 and 70 parts by weight of units of the formula:

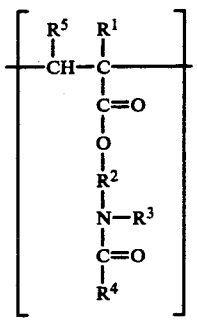

wherein $R^1$, $R^2$, $R^3$, $R^4$, and $R^5$ are as identified above, any balance of the polymer being the units of —X— of addition polymerized ethylenically unsaturated monomers other than said units of Formulas II and V, the total parts of all said units being 100, the viscosity of a 20% solids solution in an 80/20 water/diethylene glycol monobutyl ether cosolvent mixture being between 100 and 10,000 cps. at 20°–22° C., in which the composition optionally includes a metal compound drier in an amount up to 0.5%, on a metal basis, of the total polymer weight in the composition.

5. The method of claim 4 in which the polymer composition contains units of:
   (a) 0–80 parts by weight of a monomer selected from esters of acrylic acid or methacrylic acid,
   (b) 0–60 parts by weight of a vinyl aromatic hydrocarbons or an $\alpha,\beta$ unsaturated nitrile,
   (c) 2–15 parts of an ethylenically unsaturated carboxylic acid,
   (d) 10–60 parts by weight of units of Formula V, and the total of (a), (b), (c), and (d) being 100.

6. The method of claim 5 in which the polymer composition contains mer units wherein:
   (a) is at least 30 parts and is selected from one or more of ethyl acrylate, butyl acrylate, 2-ethylhexyl acrylate, sec-butyl acrylate, isobutyl acrylate, isopropyl acrylate, methyl methacrylate, butyl methacrylate, ethyl methacrylate, lauryl methacrylate, isobutyl methacrylate,
   (b) is selected from one or more of styrene, acrylonitrile, and vinyl toluene,
   (c) is selected from one or more of acrylic acid, methacrylic acid, maleic acid, and itaconic acid, and is present in an amount of from 2 to 15 parts,
   (d) is present in the amount of between about 20 and 50 parts,
   the polymer consisting essentially of (a), (b), (c), and (d).

7. The method of claim 6 in which the units of Formula V are such that n is 2, $R^3$ is —H, —$CH_3$, or $CH_3CH_2$—, and $R^4$ is the residue of one or more of the drying oil acids selected from tung oil acids, soybean oil acids, linseed oil acids, dehydrated castor oil acids, safflower and conjugated safflower oil acids.

8. The method of claim 7 in which a blend of said drying oil acids is utilized which contains 50–90% by weight of dehydrated castor, safflower, conjugated safflower, or soybean oil acids, or a mixture thereof, with 10–50% by weight of tung oil acids.

9. An article of manufacture prepared by the method of claim 8.

10. An article of manufacture prepared by the method of claim 7.

11. An article of manufacture prepared by the method of claim 6.

12. An article of manufacture prepared by the method of claim 5.

13. An article of manufacture prepared by the method of claim 4.

14. The method of claim 3 in which the primer polymer is a water reducible alkyd having an acid number between about 30 and about 100 and a solution viscosity at 20% solids in a water/cosolvent mixture of between 100 and 5,000 centipoise, in which the composition optionally includes a metal drier in an amount up to 0.5%, on a metal basis, of the total polymer weight in the composition.

15. The method of claim 14 in which the polymer is composed of the reaction products of
   (a) 20–50 parts by weight of a drying oil fatty acid or drying oil fatty acid triglyceride and
   (b) 20–50 parts by weight of a polyol and
   (c) 20–50 parts by weight of a polyfunctional carboxylic acid or anhydride.

16. An article of manufacture prepared by the method of claim 15.

17. An article of manufacture prepared by the method of claim 14.

18. An article of manufacture prepared by the method of claim 3.

19. An article of manufacture prepared by the method of claim 2.

20. An article of manufacture prepared by the method of claim 1.

* * * * *